March 31, 1931.  P. R. ROHM  1,799,065
BUMPER
Filed June 13, 1930 2 Sheets-Sheet 1
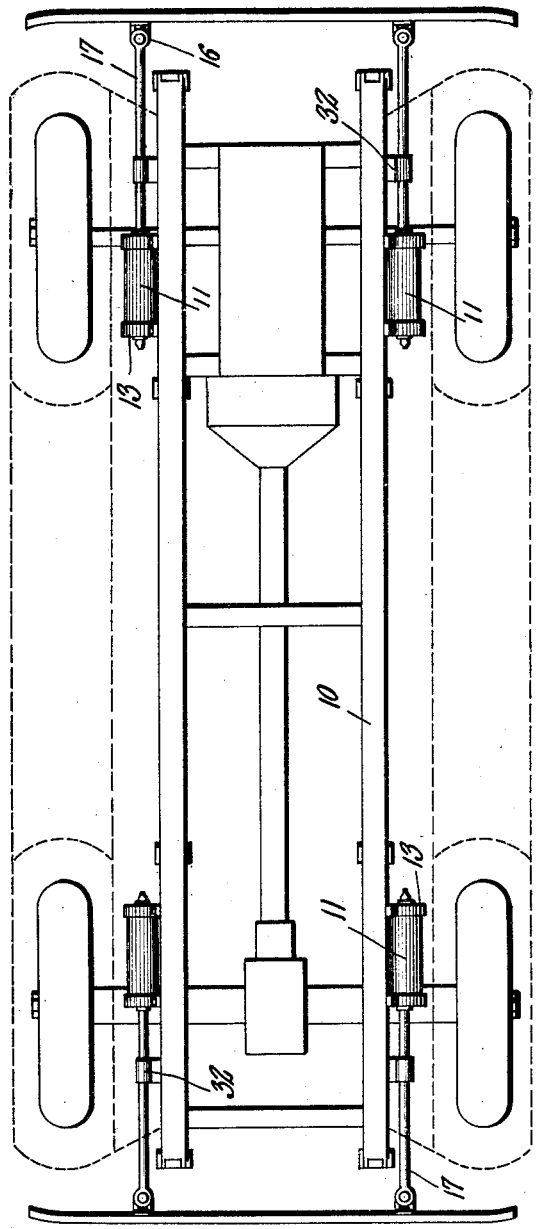
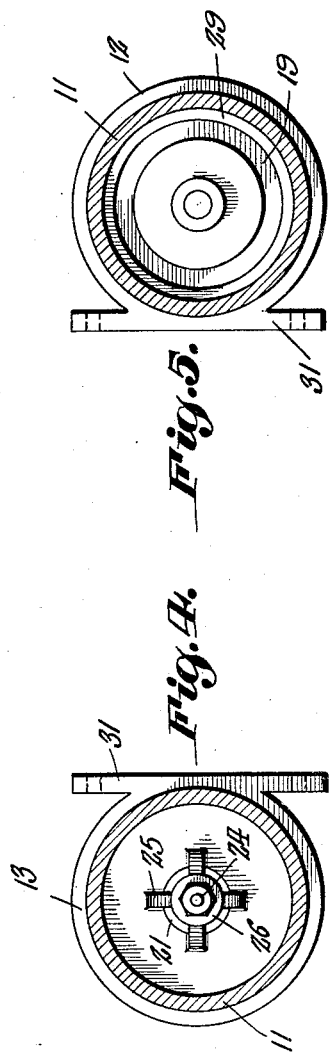
P. R. Rohm, INVENTOR
BY Victor J. Evans
ATTORNEY March 31, 1931.   P. R. ROHM   1,799,065
BUMPER
Filed June 13, 1930   2 Sheets-Sheet 2

P. R. Rohm, INVENTOR
BY Victor J. Evans
ATTORNEY

Patented Mar. 31, 1931

1,799,065

UNITED STATES PATENT OFFICE

PEMBERTON RAY ROHM, OF VANDERBILT, PENNSYLVANIA, ASSIGNOR OF TWO-FIFTHS TO BERTHA ROHM, OF VANDERBILT, PENNSYLVANIA

BUMPER

Application filed June 13, 1930. Serial No. 461,007.

This invention relates to certain new and useful improvements in fenders or bumpers for motor vehicles and the like.

One of the principal objects of the invention consists in the provision and arrangement of shock absorbing means for the fenders or bumpers to alleviate the usual impact when colliding.

Another object of the invention consists of regulating means for the shock absorbers to adapt the invention to the different types and weights of vehicles as well as the otherwise natural tendency to throw passengers out of the vehicle when colliding.

With the above and other objects in view, the invention further consists of the following novel features and details of construction, to be hereinafter more fully described, illustrated in the accompanying drawings and pointed out in the appended claim.

In the drawings:

Figure 1 is a top plan view of the present invention shown applied to the chassis of a motor vehicle.

Figure 3:
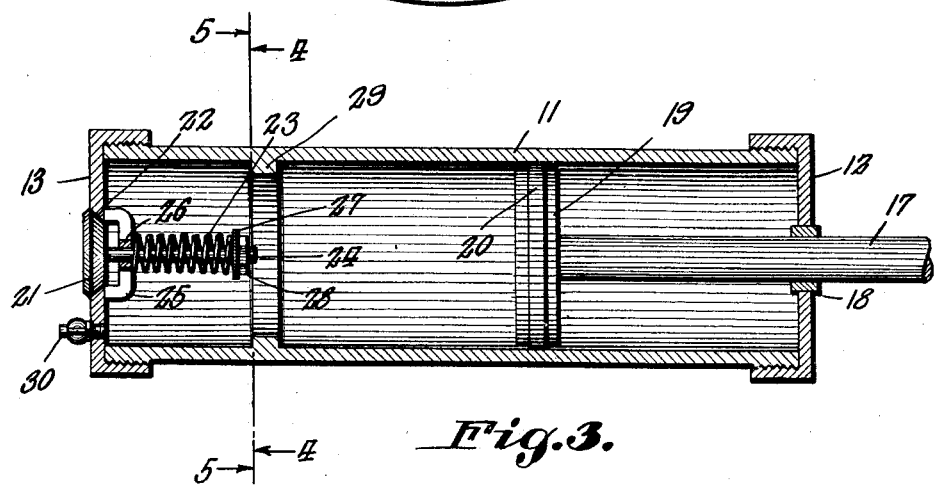
Figure 3 is a longitudinal sectional view taken through one of the shock absorbers.

Figures 4 and 5 are horizontal sectional views taken on lines 4—4 and 5—5 respectively through Figure 3 of the drawings.

Referring to the drawings in detail wherein like characters of reference denote corresponding parts, the reference character 10 indicates generally a conventional form of motor vehicle chassis, to the outer sides and adjacent the ends of which the present invention is designed for application. Each of the absorbers comprises a tubular form of cylinder 11 exteriorly threaded adjacent the ends thereof to accommodate cup-shaped closure caps 12 and 13 respectively.

Figure 2:
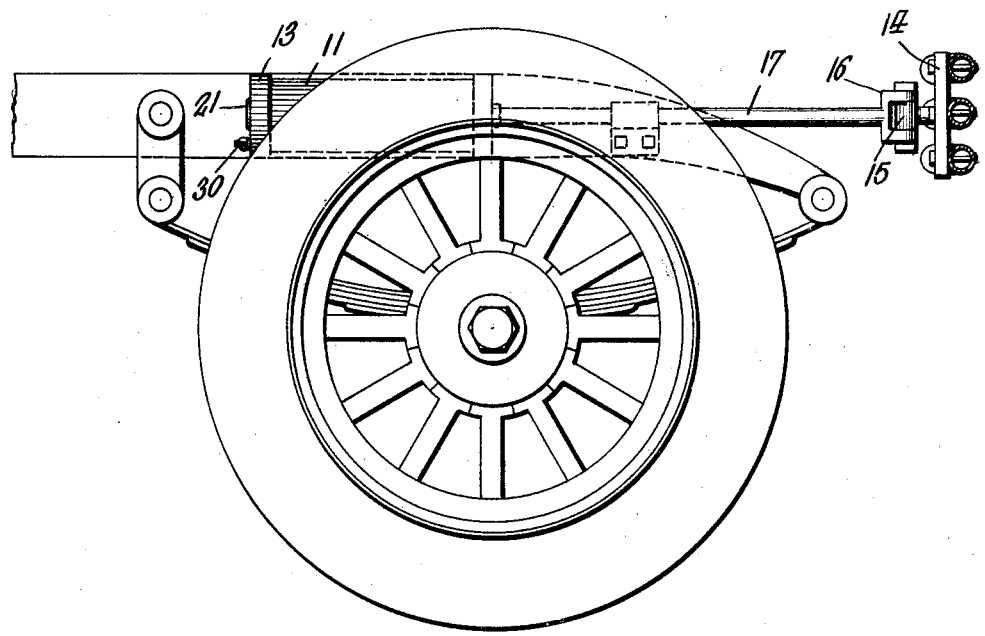
Figure 2 is an enlarged fragmentary side elevation of a motor vehicle chassis disclosing the relative arrangement of the absorber.

The bumpers are preferably of the triple bar and tubular forms designed for disposition in the manner suggested in Figure 2 of the drawings whereby the bumpers of cars colliding therewith, whether high or low, will be sure to contact therewith. The attaching plates 14 for the bars or tubular members, forming the bumpers, are provided with ears 15 for pivotal connection within the bifurcated ends 16 of plunger rods 17, the latter being slidably mounted within bushings 18 in the closure caps 12. A plunger head 19 is arranged upon the innermost end of each of the plunger rods or shafts and provided with a piston or packing ring 20 having wiping contact with the inner side wall of the immediate cylinder in the ordinary manner.

Blow off or relief valves of the poppet type having the heads 21 therefor normally disposed for flush fitting engagement with seats 22 provided within the closure caps 12 are yieldingly maintained in such positions through the employment of compression springs 23 encircling the valve stems 24. Spider members 25 are carried upon the closure caps 13 and slidably accommodate the stems 24 of the valves within bearing sleeves 26 and against which the adjacent ends of the compression springs repose. A seating washer and adjusting nut 27 and 28 respectively are carried upon the inner ends of the valve stems to regulate the tension of the spring whereby any desired pressure may be maintained within the cylinders as against the movement of the plunger heads 19. It is to be noted that movement exercised by the plunger heads greater than that predetermined or desired will cause the valves 21 to open and further inward movement will be permitted to the bumper construction to absorb the shock of the colliding vehicles.

An annular ring or shoulder portion 29, arranged upon the inner side walls of the respective cylinders, are designed to abut the adjacent ends of the plunger heads 19 when same are shifted to occupy extreme positions and in order that the valve arrangement will not be disturbed. Petcocks 30, arranged upon each of the closure caps 13 are utilized for the purpose of allowing the cylinders to be refilled with air and destroy the suction action against each of the plunger heads as same are shifted outwardly to occupy their normal inactive positions. It is obviously apparent from the illustrations of my invention in Figures 1, 4 and 5 of the drawings that the cylinders are secured in position upon the chassis bars of the vehicle through the employment of attaching ears 31 carried upon the closure caps 12 and 13 of each cylinder.

Bearing sleeves or guide members 32 may be arranged at intervals upon the chassis bars of the vehicle beyond the cylinders 21 to accommodate the projecting portions of the plunger rods 17 whereby the latter may be guided axially of the longitudinal center of the immediate cylinder to obviate loss of compression by a canted or distorted plunger head.

The invention is susceptible of various changes in its form, proportions and minor details of construction and the right is herein reserved to make such changes as properly fall within the scope of the appended claim.

Having described the invention, what is claimed is:

A pneumatic bumper construction comprising air compressing cylinders and plungers therefor, rods for the plungers having pivotal connection with the adjacent portions of the bumper to permit independent lateral swinging movement of either end of the latter, a pressure operable valve for each of the cylinders releasing greater than predetermined pressure, and adjusting means for each of said valves.

In testimony whereof I affix my signature.

PEMBERTON RAY ROHM.